I. NEWMAN.
TOOL FOR CAPPING CANS.
APPLICATION FILED APR. 27, 1917.
1,266,519.
Patented May 14, 1918.
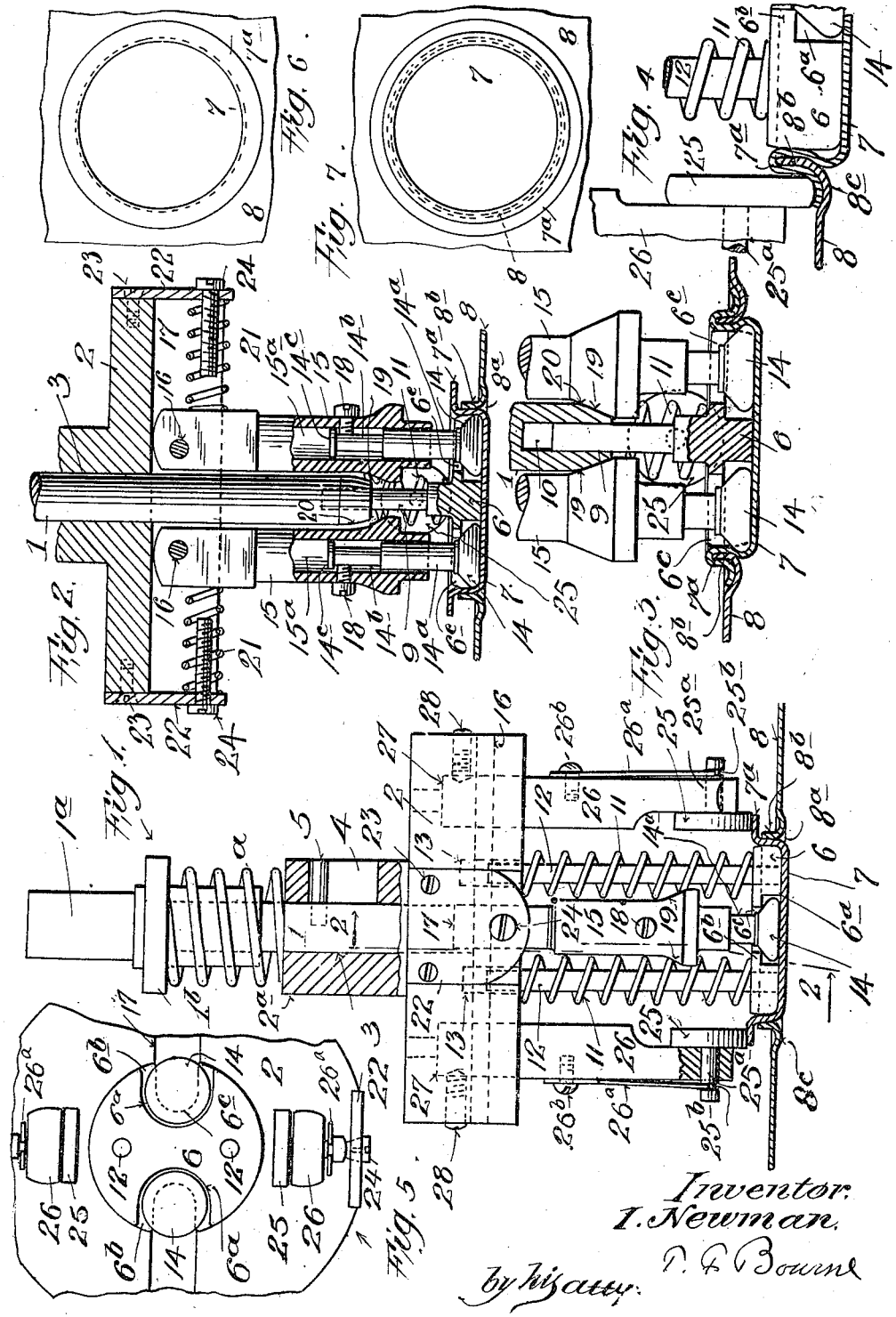
Inventor:
I. Newman,
P. F. Bourne
by his atty.

UNITED STATES PATENT OFFICE.

ISIDOR NEWMAN, OF NEW YORK, N. Y.

TOOL FOR CAPPING CANS.

1,266,519.  Specification of Letters Patent.  Patented May 14, 1918.

Application filed April 27, 1917. Serial No. 164,838.

*To all whom it may concern:*

Be it known that I, ISIDOR NEWMAN, a citizen of the United States, and resident of New York city, borough of the Bronx, in the county of the Bronx and State of New York, have invented certain new and useful Improvements in Tools for Capping Cans, of which the following is a specification.

Some classes of tin cans are provided with filling holes in which caps are fitted, and sometimes such caps are soldered in place and other times the caps are seamed to the can head.

My invention has reference to an improved tool or machine adapted to turn a transverse flange of a cap over a neck or outwardly projecting flange of the can body, and also to expand the side of the cap against the can body, such operations being carried out simultaneously by pressure upon the tool and rotation of the tool.

My invention comprises novel details of improvement and combinations of parts that will be more fully hereinafter set forth and then pointed out in the claims.

Reference is to be had to the accompanying drawings forming part hereof, wherein, Figure 1 is a partly sectional side elevation of a cap seaming tool embodying my invention; Fig. 2 is a section substantially on the line 2, 2, in Fig. 1, showing the parts ready for operation; Fig. 3 is an enlarged detail section of part of Fig. 2, illustrating the parts in the operating position; Fig. 4 is an enlarged detail view at right angles to Fig. 3; Fig. 5 is an end view of Fig. 2, part being removed; Fig. 6 is a face view illustrating a cap in position on the can body, and Fig. 7 is a similar view illustrating the cap seamed on the can body.

Similar numerals of reference indicate corresponding parts in the several views.

At 1 is a spindle, the outer portion $1^a$ of which is adapted to be fitted to a suitable tool, such as to the chuck of a drill press or other means, whereby said spindle may be pushed longitudinally toward a can and rotated. At 2 is a body having a bore 3 in which spindle 1 is slidably fitted. Means are provided to cause rotation of said body with the spindle while permitting relative longitudinal movement of one with relation to the other, for which purpose I have shown the hub $2^a$ of said body provided with a longitudinal slot 4, receiving a pin or projection 5 extending from spindle 1. The pin and slot connection also retains the body in assembled relation. A spring at $a$ interposed between hub $2^a$ and shoulder or stop $1^b$ on spindle 1, serves normally to press the spindle and body apart as limited by pin 5. The spring may be omitted if desired. At 6 is a plunger or a guiding head shown in circular form adapted to fit and rotate within a flanged cap 7, that is to be secured in a hole $8^a$ in a can body 8. Said plunger is shown provided with a stem 9 that is slidable in a bore 10 in the lower end of spindle 1, whereby said plunger is operatively maintained concentrically with respect to the axis of said spindle to rotate within the cap for guiding purposes. The plunger or guiding head 6 is preferably normally pushed outwardly by one or more springs 11 interposed between said plunger and body 2. I have shown two springs for such purpose and the plunger provided with spaced rods 12 projecting from the plunger, and guided to slide in bores 13 in body 2, said rods being shown passing through and guiding the springs 11. At 14 are indicated rolls adapted to be fitted within cap 7 to expand the latter against adjacent marginal portions of the can body, which rolls are adapted for coöperation with the plunger or guiding head 6. Said rolls are shown diametrically spaced apart and the under side of plunger 6 is shown provided with recesses $6^a$ to which rolls 14 are fitted, the metal $6^b$ above said rolls being adapted to bear upon the latter, whereby the springs 11 when pushing the plunger outwardly will also push the rolls outwardly. Plunger 6 is slotted transversely at $6^c$ to permit lateral movement of the stems $14^a$ of rolls 14. Said stems are shown guided to slide in bores 15 in arms 15, the upper ends of which are pivotally supported upon pins or the like 16, fitted in holes in body 2. The upper ends of arms 15 are shown squared and fitted in a transverse slot 17 in body 2, whereby said arms with the rollers 14 may move laterally but will be rotated by body 2. The stems $14^a$ of rolls 14 are shown retained in bores $15^a$ of arms 15 by means of screws 18 threaded in said arms, said screws entering annular depressions $14^b$ in the stem $14^a$, the end portions 14ᶜ of said stems serving to limit outward movement thereof by engagement with screws 18 against the tension of springs 11, whereby the outward movement of plunger or guiding head 6 is limited by reason of the engagement of the portions 6ᵇ thereof with the rolls 14. When the screws 18 are removed the stems 14ᵃ may pass out of the bores 15ᵃ thus permitting removal of the rolls, the plunger and the springs. While I have shown two rolls 14 on opposite sides of the axis of spindle 1, and located at right angles to the guiding rods 12, it will be understood that one or more of such rolls may be provided if desired.

The outer periphery of rolls 14 may substantially coincide with or be within the circumferential arc of plunger 6 for insertion in cap 7 with said plunger. To force the rolls 14 outwardly within cap 7 for spinning or pressing the latter against the adjacent portion of the body, the arms 15, near their lower ends, are provided with cam-like surfaces 19 adapted to be engaged by the cammed or downwardly inclined portion 20 of spindle 1. When the spindle is moved outwardly with respect to body 2 the cammed portion 20 of the spindle will be drawn back from cams 19, and when the spindle is pushed inwardly or toward the plunger the cammed portion 20 will engage the cams 19 and cause the arms 15 to spread apart to correspondingly spread the rolls 14 to force them against the inner wall of cap 7. Springs 21 may be provided to press arms 15 and rolls 14 inwardly toward spindle 1, whereby said rolls will be maintained in position for ready insertion into and removal from cap 7. I have shown said springs interposed between arms 15 and stops 22 secured upon the outer edge of body 2 by screws 23, and at 24 are screws carried by stops 22 for retaining said springs in position.

I have also shown means for spinning down or seaming the laterally projecting flange 7ᵃ of cap 7 over the out-turned neck or flange 8ᵇ of the can body that surrounds the hole 8ᵃ thereof, which is accomplished at the time that the rolls 14 expand or spin the lower marginal portion of the cap. For such purpose I have shown rollers 25 spaced apart on opposite sides of plunger or guiding head 6, adapted to bear upon the portion of flange 7ᵃ that projects beyond neck 8ᵇ. The rollers 25 are shown disposed diametrically at right angles with respect to the rolls 14. The rollers 25 are journaled upon spaced projections 26 extending from body 2 and operate at right angles to the operation of rolls 14. Said projections may be in the form of rods or bars seated in recesses 27 in body 2, and retained in position by screws 28 threaded in said body. The stems 25ᵃ of said rollers are journaled in bearings in the projections 26, and I have shown springs 26ᵃ having forked ends entering annular recesses 25ᵇ in said stems for normally pressing said stems outwardly and for retaining the rollers in proper position upon projections 26. The springs have an outward tendency and are shown secured upon projections 26 by screws 26ᵇ. By removing springs 26ᵃ the rollers 25 may be removed and replaced.

When a cap is to be secured on the can body, the cap is seated in hole 8ᵃ and the plunger 6 and rolls 14 are inserted in the cap (Fig. 2) and pressure is applied downwardly upon the spindle, whereupon the cap will be pushed by the plunger snugly in the hole to force its flange 7ᵃ upon the neck 8ᵇ, and the cam part 20 of the spindle will engage the cam parts 19 of arms 15 to spread the latter, whereupon rolls 14 may be forced into engagement with a marginal portion of the cap. The tool will be rotated and the plunger or guiding head 6 with the rolls 14 will rotate within the cap, and continued pressure of the spindle downwardly will cause rolls 14 to be gradually pressed outwardly to spin or expand the cap side wall against the adjacent portion of the can body below neck 8ᵇ, and during such operation the rollers 25 will bear upon the portion of flange 7ᵃ that extends beyond neck 8ᵇ to spin down said portion of the flange over the neck 8ᵇ, and the roller 25 in conjunction with the plunger squeezes the flange 7ᵃ, the neck 8ᵇ and the margin of the cap tightly together, substantially to the positions shown in Figs. 3 and 4. The body 2 and rollers 25, by being rotated by and with spindle 1, will be caused to move toward the can body by reason of the natural and automatic effort of the body to slide along the spindle on which it is freely mounted, assisted by the pressure of spring *a* when the latter is used. Since can bodies of the class referred to are frequently provided with an annular depression at 8ᶜ around the neck 8ᵇ the marginal portion of flange 7ᵃ of the cap not only will be turned down along said cap, but will be spun laterally into the annular depression 8ᶜ (Figs. 3 and 4). The combined operation of the rollers 25 on the outside of the neck 8ᵇ tending to resist expansion of the neck while crowding the flange 7ᵃ down along said neck, and the outer pressure of the rotating rolls 14 against the side wall of the cap serving to crowd the metal of the parts 7, 8 together, while spinning the side walls of the cap against the can body in a forcible manner, effect a tight hermetical marginal sealing of the cap on the can body. When the cap has been sealed in place the spindle 1 will be pulled outwardly or raised, relieving its cammed portion 20 from arms 15 and the latter may swing inwardly to release the rolls 14 from the cap, whereupon the tool may be removed from the can, the member 2 rising with the spindle.

Having now described my invention what I claim is:—

1. A tool of the class described comprising a plunger to rotate within a cap, a roll coöperative with the plunger within the cap, a spindle movable separately from the roll and plunger to force the roll laterally within and against the cap to spin the latter, a roller to operate on a lateral flange of the cap, and means to direct the roller against said flange while the roll operates against and within the cap.

2. A tool of the class described comprising a laterally movable roll, a plunger receiving the roll permitting its lateral movement, means to press the roll laterally in spinning contact with a cap, a vertically movable roller spaced laterally from the roll and from the plunger, and means to rotate said plunger roll and roller bodily with relation to a cap to simultaneously expand a wall of the cap and bend a flange of the cap over the neck of a can body.

3. A tool of the class described comprising a spindle, a laterally movable roll, a plunger receiving the roll permitting its lateral movement, a body carrying said roll and plunger and movable relatively to the spindle, means coöperative between the spindle and roll for moving the roll laterally, a roller carried by the body adjacent to the roll and plunger, and means to rotate the body with the spindle, whereby the roll may operate within the cap to spin it, and the roller may bend a flange of the cap between the roller and the plunger when the tool rotates.

4. A tool of the class described comprising a spindle, a body movable relatively to the spindle, a plunger movable relatively to the spindle, a roll coöperative with the plunger, means connecting the roll with the plunger and with the body to rotate them together, a roller carried by the body spaced from the roll, and means to rotate the body with the spindle, the roller being movable relatively to the roll to bend a flange while the roll spins a cap having such flange.

5. A tool of the class described comprising a spindle having a bore, a plunger having a stem slidable in said bore, a roll coöperative with the plunger, adapted to enter a cap to spin it, the plunger having a recess receiving the roll, a guide for the roll movable laterally, and means coöperative between the spindle and guide for moving the latter and the roll laterally by longitudinal movement of the spindle to spin within a cap.

6. A tool of the class described comprising a spindle having a bore, a plunger to coöperate with a cap and having a stem slidable in said bore, a roll coöperative with the plunger within the cap, a guide for the roll movable laterally, the roll having outward movement relatively to the guide, means coöperative between the spindle and guide for moving the latter and the roll laterally to spin a cap, a spring normally pressing the plunger outwardly with the roll, and means to limit outward movement of the plunger and roll.

7. A tool of the class described comprising a spindle having a bore, a plunger having a stem slidable in said bore, a roll coöperative with the plunger, a laterally movable guide having a bore, said roll having a stem slidable in the last-named bore, means to permit limited longitudinal movement of the last-named stem relative to the guide, means coöperative between the spindle and guide for moving the latter and the roll laterally, and a spring normally pressing the plunger outwardly to correspondingly move the roll.

8. A tool of the class described comprising a spindle, a body rotative with and movable longitudinally along the spindle, a plunger, means movably supporting and guiding the plunger with respect to the spindle and body, an outwardly movable roll coöperative with the plunger, a guide movably carried by the body and operatively connected with the roll, whereby the plunger may be rotated with the spindle and the roll may move laterally relatively to the plunger, means coöperative between the spindle and guide to cause the roll to move laterally, and a spring coöperative between the body and plunger for normally pushing the latter and the roll outwardly.

9. A tool of the class described comprising a spindle, a body rotative with and movable longitudinally along the spindle, a plunger, means movably supporting and guiding the plunger with respect to the spindle and body, an outwardly movable roll coöperative with the plunger, a guide movably carried by the body and operatively connected with the roll, whereby the plunger may be rotated with the spindle and the roll may move laterally relatively to the plunger, means coöperative between the spindle and guide to cause the roll to move laterally, a spring coöperative between the body and plunger for normally pushing the latter and the roll outwardly, and a roller carried by the body adjacent to the roll to operate on a cap flange.

10. A tool of the class described comprising a spindle, a body rotative with and movable longitudinally along the spindle, a plunger, means movably supporting and guiding the plunger with respect to the spindle and body, a guide movably carried by the body, a roll having a stem guided by said guide, the plunger having a recess receiving the roll and having a portion cooperative with the roll to push the latter outwardly, a spring between the plunger and the body, means to limit outward movement of the roll and thereby the plunger, means coöperative between the spindle and the roll guide for moving the latter laterally, and a roller carried by the body and operative at right angles to the plane of operation of the roll for bending a flange of the cap.

11. A tool of the class described comprising a spindle, a body rotative with and movable longitudinally along the spindle, a plunger having a stem guided by the spindle, a guide movably carried by the body and provided with a bore, a roll having a stem slidable in the bore, means to limit longitudinal movement of the stem in the bore, the plunger having a recess coöperative with the roll to permit lateral movement of the roll and to move the roll with the plunger, a spring coöperative between the plunger and the body for normally moving the plunger and the roll outwardly, and means coöperative between the spindle and the guide carrying the roll for moving the latter laterally.

12. A tool of the class described comprising a spindle, a body rotative with and movable longitudinally along the spindle, a plunger, guiding means for the plunger, a spring normally pushing the plunger outwardly, a pair of guides pivotally carried by the body on opposite sides of the spindle, a pair of rolls guided by said guides, the plunger having means coöperative with the rolls to push them outwardly and to permit the rolls to move relatively to the plunger, means to limit outward movement of the rolls and thereby the plunger, projections extending from the body on opposite sides of the spindle, rollers carried by the projections and spaced from said rolls adapted to bear upon a cap flange while the rolls operate within the cap, and means coöperative between said spindle and the roll guides for moving the latter and the rolls laterally.

13. A tool of the class described comprising a spindle, a body rotative with and movable longitudinally along the spindle, a plunger, guiding means for the plunger, a spring normally pushing the plunger outwardly, a pair of guides pivotally carried by the body on opposite sides of the spindle, a pair of rolls guided by said guides, the plunger having means coöperative with the rolls to push them outwardly and to permit the rolls to move relatively to the plunger, means to limit outward movement of the rolls and thereby the plunger, projections extending from the body on opposite sides of the spindle, rollers carried by the projections and spaced from said rolls adapted to bear upon a cap flange while the rolls operate within the cap, means coöperative between said spindle and the roll guides for moving the latter and rolls laterally, and springs coöperative between said guides and the body for moving the guides reversely to their operation by the spindle.

14. A tool of the class described comprising a spindle having a bore, a body rotative with and movable longitudinally along the spindle, a plunger having a stem guided in the bore of the spindle, said plunger having rods on opposite sides of the spindle and guided by said body, springs interposed between the body and the plunger, guides pivotally carried by the body and spaced from the spindle, said guides having bores, rolls having stems slidable in said bores, means to limit longitudinal movement of the stems in the bores, the plunger having recesses coöperative with said rolls and their spindles permitting lateral movement of the rolls, projections carried by said body and located on opposite sides of the spindle, and rollers rotatively carried by the projections and spaced from said rolls at an angle thereto for operation on a cap flange while the rolls operate within the cap.

Signed at New York city, in the county of New York and State of New York, this 25th day of April, A. D. 1917.

ISIDOR NEWMAN.